United States Patent
Odajima

(10) Patent No.: US 10,044,896 B2
(45) Date of Patent: Aug. 7, 2018

(54) IMAGE PROCESSING APPARATUS, SERVER APPARATUS, AND IMAGE PROCESSING SYSTEM FOR INSTALLING OF IMAGE PROCESSING APPARATUS APPLICATIONS THROUGH A WEB BROWSER

(71) Applicant: FUJI XEROX CO., LTD., Tokyo (JP)

(72) Inventor: Kouichi Odajima, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/445,357

(22) Filed: Feb. 28, 2017

(65) Prior Publication Data

US 2018/0091690 A1 Mar. 29, 2018

(30) Foreign Application Priority Data

Sep. 26, 2016 (JP) ................................ 2016-187263

(51) Int. Cl.
G06F 15/00 (2006.01)
G06F 3/12 (2006.01)
(Continued)

(52) U.S. Cl.
CPC ....... *H04N 1/00973* (2013.01); *G06F 9/4411* (2013.01); *G06F 13/122* (2013.01);
(Continued)

(58) Field of Classification Search
CPC ........... H04N 1/00973; H04N 1/00204; H04N 1/00411; H04N 1/00464; H04N 1/32776;
(Continued)

(56) References Cited

U.S. PATENT DOCUMENTS

2002/0042838 A1* 4/2002 Tabayoyon, Jr. ....... H04L 29/06
709/237
2011/0041144 A1* 2/2011 Araki ..................... G06F 9/541
719/328
(Continued)

FOREIGN PATENT DOCUMENTS

JP 2014-116803 A 6/2014
JP 2015-222872 A 12/2015

OTHER PUBLICATIONS

O'Tuathail et al; "Using the Simple Object Access Protocol (SOAP) in Blocks Extensible Exchange Program (BEEP);" The Internet Society; Jan. 2006; pp. 1-20.

*Primary Examiner* — Douglas Tran
(74) *Attorney, Agent, or Firm* — Oliff PLC

(57) ABSTRACT

An image processing apparatus includes an identification unit, a transfer requesting unit, an acquisition unit, and an execution unit. The identification unit identifies one of pieces of information regarding applications executable by the image processing apparatus and acquired through a web browser of the image processing apparatus. The identification unit identifies the piece of information regarding one of the applications that is selected by an operator. The transfer requesting unit requests an external apparatus to transfer the application in accordance with the identified piece of information. The acquisition unit acquires, from the external apparatus through the web browser, to-be-executed application information that is to be used when the application requested to be transferred is installed on the image processing apparatus. By using the acquired to-be-executed application information, the execution unit executes an installation process for installing the application corresponding to the to-be-executed application information on the image processing apparatus.

11 Claims, 13 Drawing Sheets

(51) Int. Cl.
*G06K 1/00* (2006.01)
*H04N 1/00* (2006.01)
*G06F 9/4401* (2018.01)
*G06F 13/12* (2006.01)
*H04N 1/327* (2006.01)

(52) U.S. Cl.
CPC ..... *H04N 1/00204* (2013.01); *H04N 1/00411* (2013.01); *H04N 1/00464* (2013.01); *H04N 1/32776* (2013.01); *H04N 2201/0094* (2013.01); *H04N 2201/3205* (2013.01)

(58) Field of Classification Search
CPC .... H04N 2201/0094; H04N 2201/3205; G06F 9/4411; G06F 13/122
USPC .............................. 358/1.1, 1.15, 1.13, 1.14
See application file for complete search history.

(56) References Cited

U.S. PATENT DOCUMENTS

2014/0160504 A1 6/2014 Nakashima
2015/0341518 A1 11/2015 Shimizu
2017/0322850 A1* 11/2017 Yang ................... G06F 11/1451

* cited by examiner

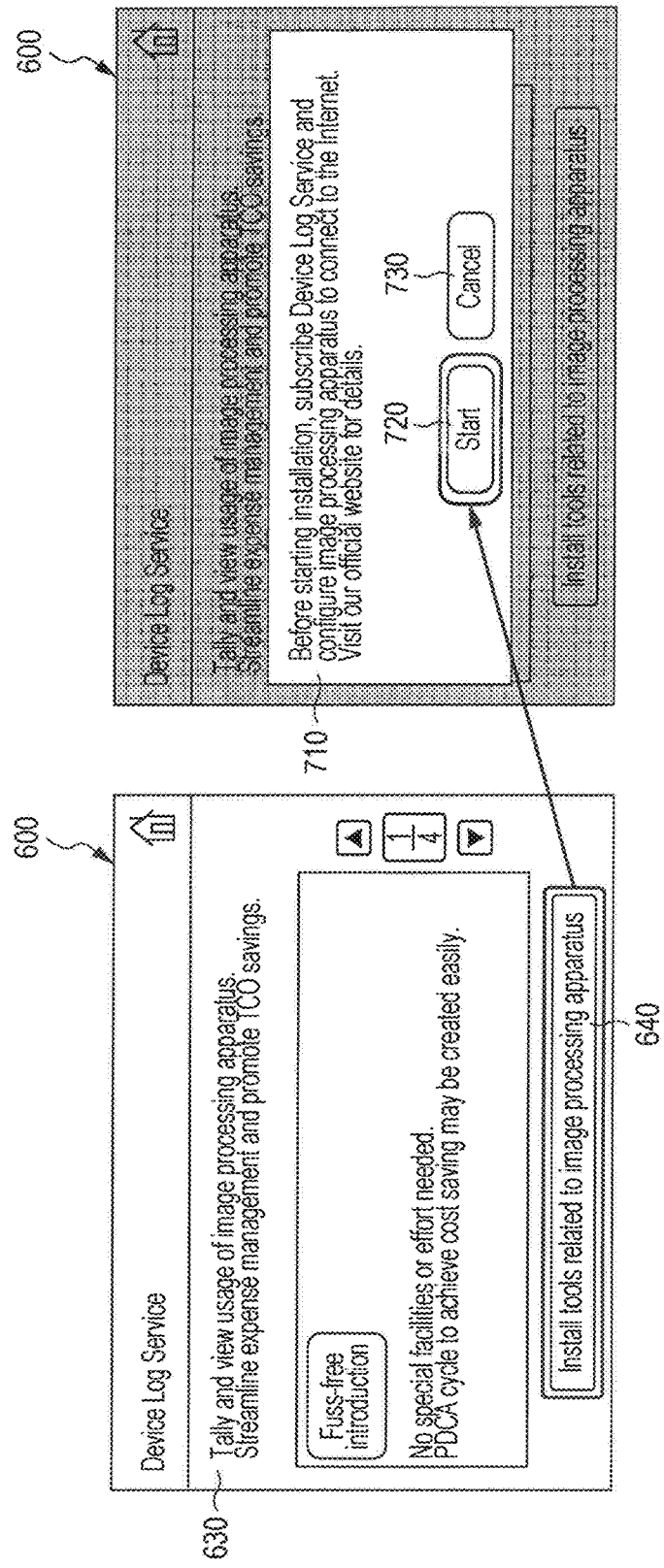

FIG. 8

```
<?xml version="1.0" ?>
<soapEnv:Envelope xmlns:soapEnv="http://schemas.xmlsoap.org/soap/envelope/">
   <soapEnv:Body>
      <GetAttribute xmlns="http://www.fujixerox.co.jp/">
         <ProductCode/>
      </GetAttribute>
   </soapEnv:Body>
</soapEnv:Envelope>
```
800
810

FIG. 9

```
<?xml version="1.0" ?>
<env:Envelope xmlns:env="http://schemas.xmlsoap.org/soap/envelope/">
   <env:Body xmlns:xsd="http://www.w3.org/2000/10/XMLSchema">
      <GetAttributeResponse xmlns="http://www.fujixerox.co.jp/">
         <ProductCode>NC100497</ProductCode>
      </GetAttributeResponse>
   </env:Body>
</env:Envelope>
```
900
910

FIG. 10

```
<?xml version="1.0" ?>
<soapEnv:Envelope xmlns:soapEnv="http://schemas.xmlsoap.org/soap/envelope/">
   <soapEnv:Body>
      <GetPlugin xmlns="http://www.fujixerox.co.jp/">
         <PluginID>DeviceLogService</PluginID>
      </GetPlugin>
   </soapEnv:Body>
</soapEnv:Envelope>
```
1000
1010

FIG. 11

```
<?xml version="1.0" ?>
<env:Envelope xmlns:env="http://schemas.xmlsoap.org/soap/envelope/">
  <env:Body xmlns:xsd="http://www.w3.org/2000/10/XMLSchema">
    <GetPluginResponse xmlns="http://www.fujixerox.co.jp/"/>
  </env:Body>
</env:Envelope>
```
1100
1110 — `<GetPluginResponse xmlns="http://www.fujixerox.co.jp/"/>`
1120 — `</env:Body>`

FIG. 12

`PluginID=DeviceLogService&ProductCode=NC100497&Installed=No` — 1200

FIG. 13

```
--boundary
Content-Type: text/xml; charset=UTF-8
Content-Transfer-Encoding: binary
Content-ID: <2>

<?xml version="1.0" ?>
<soapEnv:Envelope xmlns:soapEnv="http://schemas.xmlsoap.org/soap/envelope/">
  <soapEnv:Body>
    <InstallPlugin xmlns="http://www.fujixerox.co.jp/">
      <PluginFile href="cid:1"/>
    </InstallPlugin>
  </soapEnv:Body>
</soapEnv:Envelope>
--boundary
Content-Type: application/octet-stream
Content-Transfer-Encoding: binary
Content-ID: <1>

(Plug-in binary data)
--boundary--
```
1300

1310 points to the `<InstallPlugin>` block.

| PLUG-IN | PRODUCT CODE | PLUG-IN FILE |
|---|---|---|
| Device Log Service | NC100496 | file_NC100496 |
| | NC100497 | file_NC100497 |
| | NC100498 | file_NC100498 |
| | ... | ... |
| ... | ... | ... |

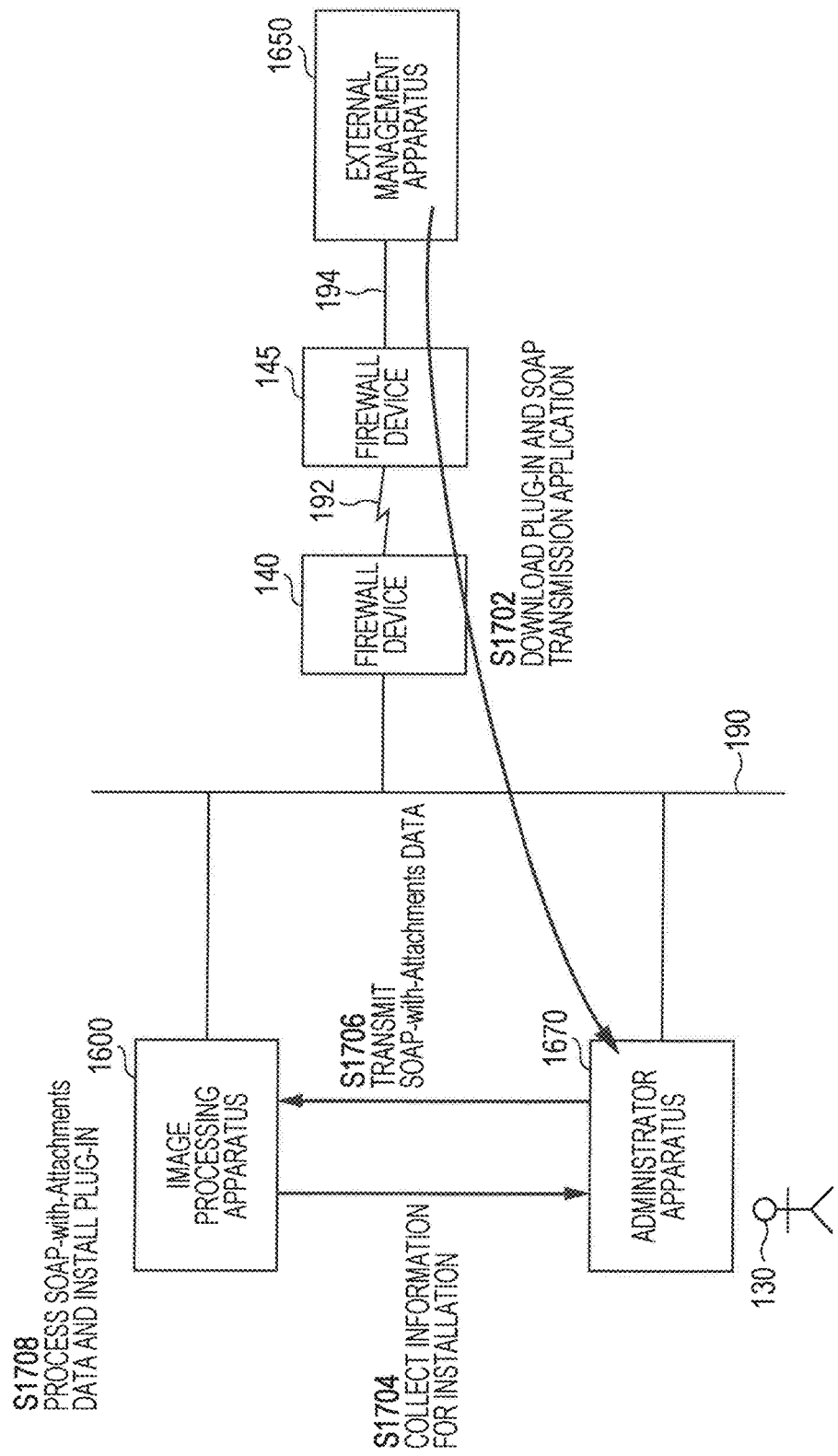

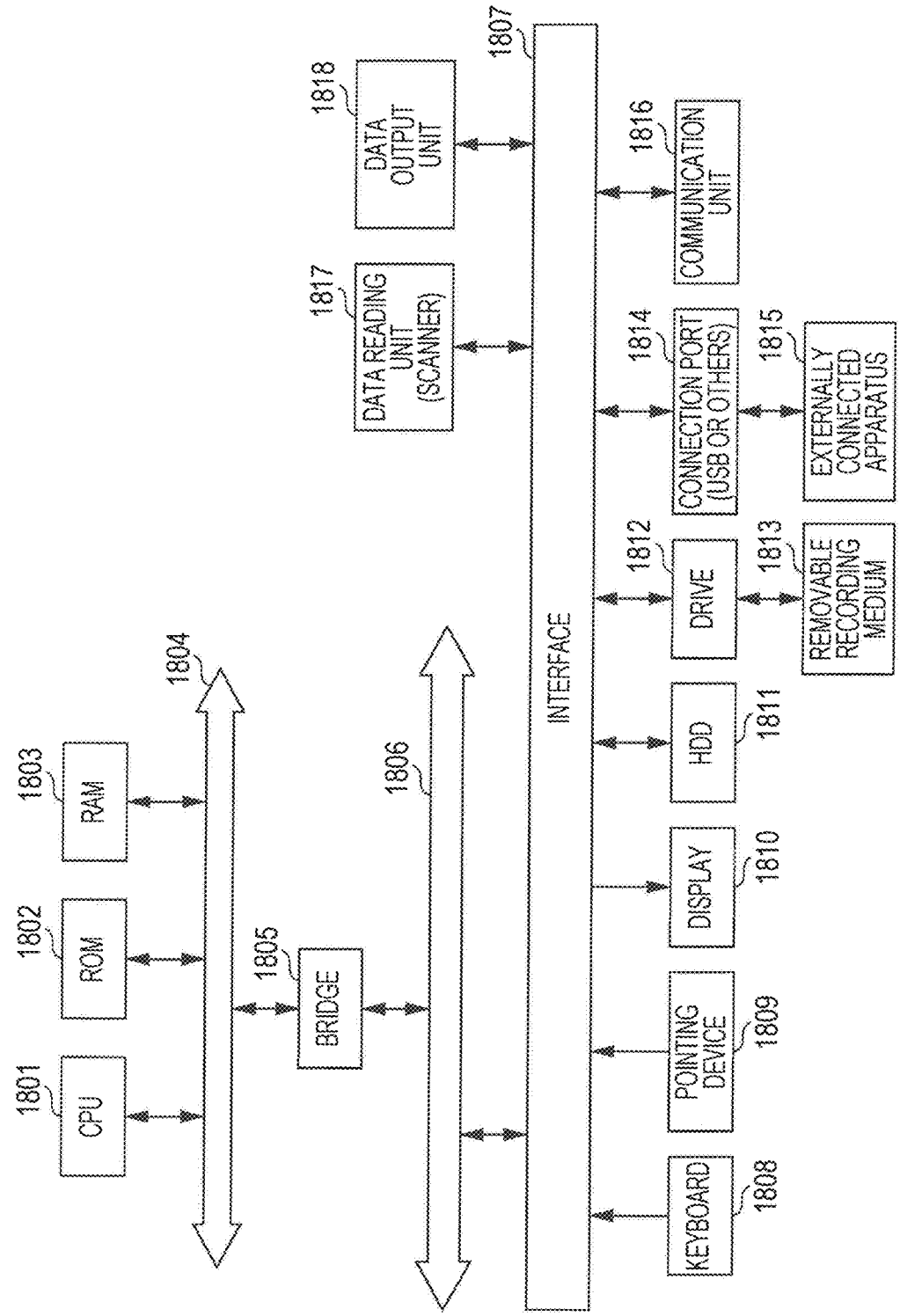

IMAGE PROCESSING APPARATUS, SERVER APPARATUS, AND IMAGE PROCESSING SYSTEM FOR INSTALLING OF IMAGE PROCESSING APPARATUS APPLICATIONS THROUGH A WEB BROWSER

CROSS-REFERENCE TO RELATED APPLICATIONS

This application is based on and claims priority under 35 USC 119 from Japanese Patent Application No. 2016-187263 filed Sep. 26, 2016.

BACKGROUND

Technical Field

The present invention relates to an image processing apparatus, a server apparatus, and an image processing system.

SUMMARY

According to an aspect of the invention, there is provided an image processing apparatus including an identification unit, a transfer requesting unit, an acquisition unit, and an execution unit. The identification unit identifies one of pieces of information regarding applications that are executable by the image processing apparatus and that are acquired through a web browser of the image processing apparatus. The identification unit identifies the piece of information regarding one of the applications that is selected by an operator. The transfer requesting unit requests an external apparatus to transfer the application in accordance with the piece of information identified by the identification unit. The acquisition unit acquires, from the external apparatus through the web browser, to-be-executed application information that is to be used when the application requested by the transfer requesting unit to be transferred is installed on the image processing apparatus. The execution unit executes, by using the to-be-executed application information acquired by the acquisition unit, an installation process in which the application corresponding to the to-be-executed application information is installed on the image processing apparatus.

BRIEF DESCRIPTION OF THE DRAWINGS

Exemplary embodiments of the present invention will be described in detail based on the following figures, wherein:

FIGS. 7A and 7B are each an explanatory diagram illustrating an example display of the screen;

FIG. 8 is an explanatory diagram illustrating an example of data details of a request;

FIG. 9 is an explanatory diagram illustrating an example of data details of a response;

FIG. 10 is an explanatory diagram illustrating an example of data details of a request;

FIG. 11 is an explanatory diagram illustrating an example of data details of a response;

FIG. 12 is an explanatory diagram illustrating an example of data details of request data;

FIG. 13 is an explanatory diagram illustrating an example of details of request data using simple object access protocol (SOAP) with Attachments;

FIG. 17 is an explanatory diagram illustrating the example technique not in accordance with the exemplary embodiments; and FIG. 18 is a block diagram illustrating an example hardware configuration of a computer that implements each exemplary embodiment.

DETAILED DESCRIPTION

Before exemplary embodiments are described, a process for installing a plug-in in an external management apparatus 1650 on one of image processing apparatuses 1600 without using the exemplary embodiments will first be described with reference to FIGS. 16 and 17. The description is provided for easy understanding of the exemplary embodiments.

Figure 16:
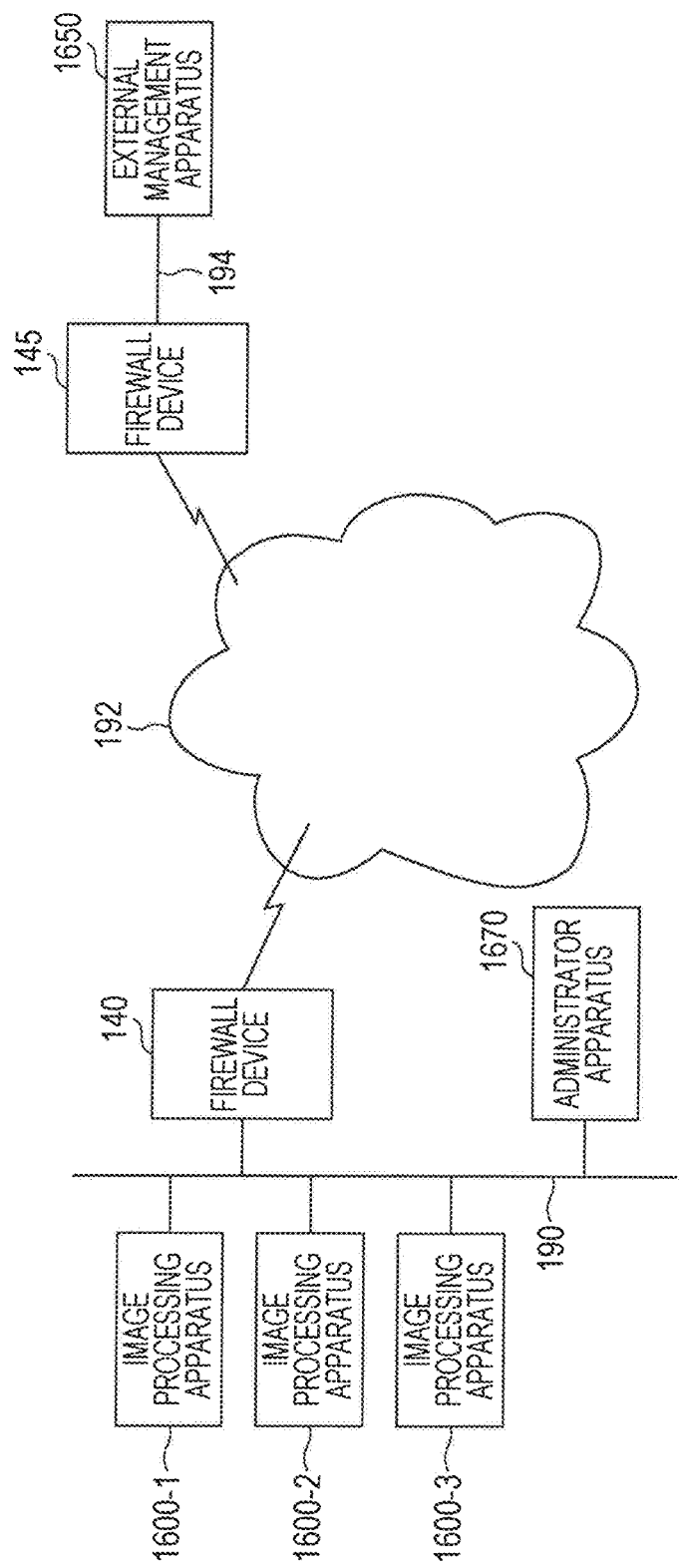
FIG. 16 is an explanatory diagram illustrating an example technique not in accordance with the exemplary embodiments.

FIG. 16 is an explanatory diagram illustrating an example technique not in accordance with the exemplary embodiments.

Image processing apparatus 1600-1, 1600-2, and 1600-3, a firewall device 140, and an administrator apparatus 1670 are connected to each other through a communication network 190. The communication network 190 is an intranet such as an in-house local area network (LAN). An administrator installs an application (hereinafter, also referred to as a plug-in) in the external management apparatus 1650 on one of the image processing apparatuses 1600 by using the administrator apparatus 1670. For example, the image processing apparatus 1600 is a multifunction printer (an image processing apparatus having two or more functions of a scanner, a printer, a copier, a fax machine, and the like), and the administrator apparatus 1670 is a PC or another apparatus.

A firewall device 145 and the external management apparatus 1650 are connected to each other through a communication network 194.

The firewall devices 140 and 145 are connected to each other through a communication network 192.

FIG. 17 is an explanatory diagram illustrating the example technique not in accordance with the exemplary embodiments.

In step S1702, the administrator apparatus 1670 downloads a plug-in and a SOAP transmission application from the external management apparatus 1650 in accordance with an operation performed by a user 130 who is an administrator.

In step S1704, the administrator apparatus 1670 collects pieces of information for installation (hereinafter, referred to as installation information) from the image processing apparatus 1600.

In step S1706, the administrator apparatus 1670 transmits data by using SOAP with Attachments (also referred to as SOAP-with-Attachments data) to the image processing apparatus 1600. Specifically, the SOAP transmission application transmits the plug-in to the image processing apparatus 1600 by using the SOAP with Attachments.

In step S1708, the image processing apparatus 1600 processes the SOAP-with-Attachments data and thereby installs the plug-in.

The administrator apparatus 1670 is needed in this process.

The SOAP technique and a web browser that are used for the exemplary embodiments will be described.

SOAP has been specified as a standard communication method for running a program on another computer on a network and is described in detail in the following document.

https://www.ietf.org/rfc/rfc4227.txt

This specification includes a file attachment method which is in general called SOAP with Attachments. Note that as described above, SOAP is an example of a computer network communication standard related to the exemplary embodiments. It is obvious for those skilled in the art that the computer network communication standard is not limited to SOAP when the exemplary embodiments are implemented.

With the advancement of web-related techniques in recent years, remarkable advancements in web browsers have made.

Use of the programming language JavaScript (registered trademark) enables screens to be dynamically expressed and processes to be executed easily.

Hereinafter, exemplary embodiments to implement the invention will be described with reference to the drawings.

Figure 1:
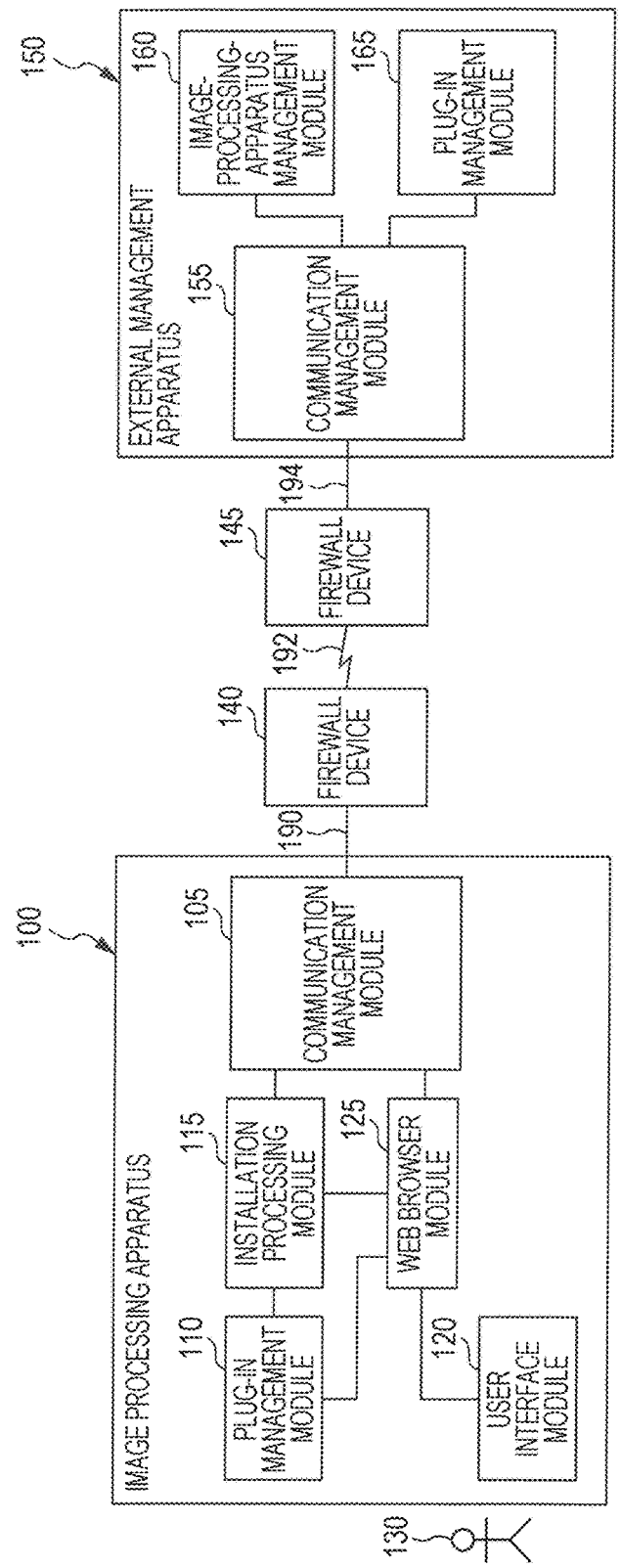
FIG. 1 is a diagram illustrating an example configuration of conceptual modules of the exemplary embodiments.

FIG. 1 illustrates a configuration example of conceptual modules of the exemplary embodiments.

Note that the term "module" refers to generally logically separable components of software (computer programs) and hardware or the like. Modules in each exemplary embodiment thus refer to not only modules in a computer program but also modules in a hardware configuration. Accordingly, the description of the exemplary embodiment also serves as a description of a computer program for causing a computer to function as the modules (a program for causing a computer to execute steps, a program for causing a computer to function as components, and a program for causing a computer to implement functions) as well as a system and a method therefor. Meanwhile, the term "to store" and other terms equivalent to "to store" are used in descriptions. In a case where the exemplary embodiment describes a computer program, the term means storing something in a storage device or controlling something so as to store something in a storage device. The modules are provided for respective functions on a one-to-one basis. However, in implementing the functions, one program may constitute one module; one program may constitute multiple modules; and multiple programs may constitute one module. In addition, one computer may run multiple modules, and multiple computers may run one module in a distributed or parallel processing environment. Note that one module may include another module. Moreover, the term "connection" is used for not only a physical connection but also a logical connection (such as data exchange, instructions, or a reference relationship among data pieces). The term "predetermined" refers to having been determined before target processing. This term is used in such a manner as to include the meaning of being determined according to the situation at the determination time or to the situation thus far only before target processing, regardless of whether before or even after the start of processing in the exemplary embodiment. Meanwhile, in a case of multiple "predetermined values", the values may be different from one another, or two or more of the values may be the same (including all of the values). Moreover, an expression "if A, then B" is used in such a manner as to mean that "it is determined whether A holds true, and if it is determined that A holds true, then B is performed". However, this excludes a case where the determination of whether A holds true is not needed.

A system or an apparatus includes not only a configuration in which multiple computers, hardware, apparatuses, and the like are connected to each other through a communication medium such as a network (including a communication connection on a one-to-one basis), but also a configuration in which a computer, hardware, an apparatus, or the like is implemented. The terms "apparatus" and "system" are used as terms having the same meaning. It goes without saying that the "system" does not include a mere social "system" built in accordance with agreements worked out by humans.

In addition, to perform a processing operation or multiple processing operations in each module, the module reads target information from a storage device for each processing, performs the processing, and writes a processing result to the storage device. Accordingly, explanations of reading the content from the storage device before processing and writing the content to the storage device after the processing are omitted in some cases. Here, the storage device may include a hard disk, a random access memory (RAM), an external storage medium, a storage device connected through a communication network, a register in a central processing unit (CPU), and other devices.

An image processing apparatus 100 and an external management apparatus 150 that are the exemplary embodiments are connected to each other through a communication network. The image processing apparatus 100 requests the external management apparatus 150 to transfer data in a desired format, and the external management apparatus 150 converts the format of the data into the requested format and transmits the data back to the image processing apparatus 100.

For example, as illustrated in FIG. 1, the connected image processing apparatus 100 is placed inside the firewall of the firewall device 140, and the connected external management apparatus 150 is placed outside the firewall of the firewall device 140. Specifically, the image processing apparatus 100 is placed in the office, and an application is installed on the image processing apparatus 100 in accordance with an operation performed by a user 130 who is an administrator. Examples of the application include digital camera printing and a device log service. In the digital camera printing, an image is extracted from a digital camera and printed, as described above. In the device log service, an operation log of the image processing apparatus 100 is transmitted to the external management apparatus 150.

The image processing apparatus 100 is office equipment for images and corresponds to, for example, a copier, a fax machine, a scanner, a printer, or a multifunction printer. In the following description, a multifunction printer is taken as a specific example. The external management apparatus 150 is a server placed in the office of, for example, the manufacturer or the like of the image processing apparatus 100 and manages the image processing apparatus 100. Specifically, the external management apparatus 150 manages applications installable on the image processing apparatus 100. The external management apparatus 150 also calculates charges of multiple image processing apparatuses 100 placed in companies having subscriptions on the basis of the usage and manages repairs, failure prevention, and the like.

The image processing apparatus 100 includes a communication management module 105, a plug-in management module 110, an installation processing module 115, a user interface module 120, and a web browser module 125.

The communication management module 105 is connected to the installation processing module 115 and the web browser module 125. The communication management module 105 is also connected to the firewall device 140 through the communication network 190, and further connected to the firewall device 145 through the communication network 192. The communication management module 105 communicates with the external management apparatus 150.

The plug-in management module 110 is connected to the installation processing module 115 and the web browser module 125. The plug-in management module 110 manages information regarding applications installed on the image processing apparatus 100. The plug-in management module 110 also manages information for installing applications on the image processing apparatus 100. For example, the plug-in management module 110 manages model-identification information (also referred to as a model code) regarding the image processing apparatus 100, an application execution environment (such as the operating system (OS), a CPU type, and a memory capacity), and the like.

The user interface module 120 is connected to the web browser module 125. Among pieces of information regarding applications that are executable by the image processing apparatus 100 and that are acquired through the web browser module 125 of the image processing apparatus 100, the user interface module 120 identifies a piece of information regarding an application selected by a user 130 who is an operator. Note that "information regarding an application" (also referred to as application information) includes at least information identifying an application (for example, an application name and an application identification (ID)).

For example, the user interface module 120 controls a liquid crystal display also serving as a touch panel, receives an operation performed by the user 130, and presents a message and the like to the user 130. The user interface module 120 may also receive operations performed by the user 130 with the mouse, the keyboard, voice, a line of sight, gesture, or the like. The user interface module 120 may also present a message to the user 130 with a speaker through audio output or with a tactile device through touch detection.

The web browser module 125 is connected to the communication management module 105, the plug-in management module 110, the installation processing module 115, and the user interface module 120. The web browser module 125 requests the external management apparatus 150 that is an external apparatus to transfer the application on the basis of the application information identified by the user interface module 120. Note that data regarding the transferred "application" may include data in an executable format for the application (also referred to as executable-format data) and text data regarding the application (for an installation command) that are mixed together.

The web browser module 125 acquires information regarding the application to be executed (also referred to as to-be-executed application information) from the external management apparatus 150 through the web browser. The to-be-executed application information is to be used when the application requested to be transferred is installed on the image processing apparatus 100. The "to-be-executed application information" may include the executable-format data for the application. If the "to-be-executed application information" has the executable-format data and the text data that are mixed together as described above, an installation command in the text data format and the executable-format data may undergo segmentation and transferred serially. Alternatively, the installation command and the executable-format data may be transferred in such a manner as to be mixed together.

The web browser module 125 may also transmit the model-identification information identifying the model of the image processing apparatus 100 to the external management apparatus 150. In other words, the web browser module 125 may have a function of notifying the external management apparatus 150 of the throughput of the image processing apparatus 100.

Further, the web browser module 125 may transmit, to the external management apparatus 150, data-format information identifying the format of data to be used to install the application on the image processing apparatus 100. Specifically, the web browser module 125 notifies the external management apparatus 150, as negotiation, of the form in which the application is to be executed in the image processing apparatus 100.

The web browser module 125 may also display the following display elements on the display controlled by the user interface module 120.

(1) Display elements for selecting a piece of information regarding a specific application by operating a web page on which a list of pieces of information regarding applications executable by the image processing apparatus 100 are displayed Specifically, the display elements correspond to icons or the like indicating the application through a graphical user interface (GUI). Selecting one of these icons through an operation performed by the user 130 corresponds to "selecting a piece of information regarding a specific application". The display elements correspond to a Device-Log-Service icon 620 (described later) and other icons illustrated in the example in FIG. 6A.

(2) A display element for requesting the external management apparatus 150 to transfer, on the basis of the application information identified by selecting one of the display elements in (1) above, to-be-executed application information including a data format to be used when the application is installed on the image processing apparatus 100

Specifically, the display element corresponds to a button or the like indicating a request for transfer and installation of the application through the GUI. The display element corresponds to an "Install tools related to image processing apparatus" button 640 (described later) or the like illustrated in the example in FIG. 6B.

(3) A display element for performing installation of the application on the image processing apparatus 100 by processing the to-be-executed application information transferred from the external management apparatus 150 and acquired through the web browser of the image processing apparatus 100

Specifically, the display element corresponds to a button or the like for the start of installation through the GUI. The display element corresponds to a Start button 720 (described later) or the like illustrated in the example in FIG. 7B.

Figures 14, 15:
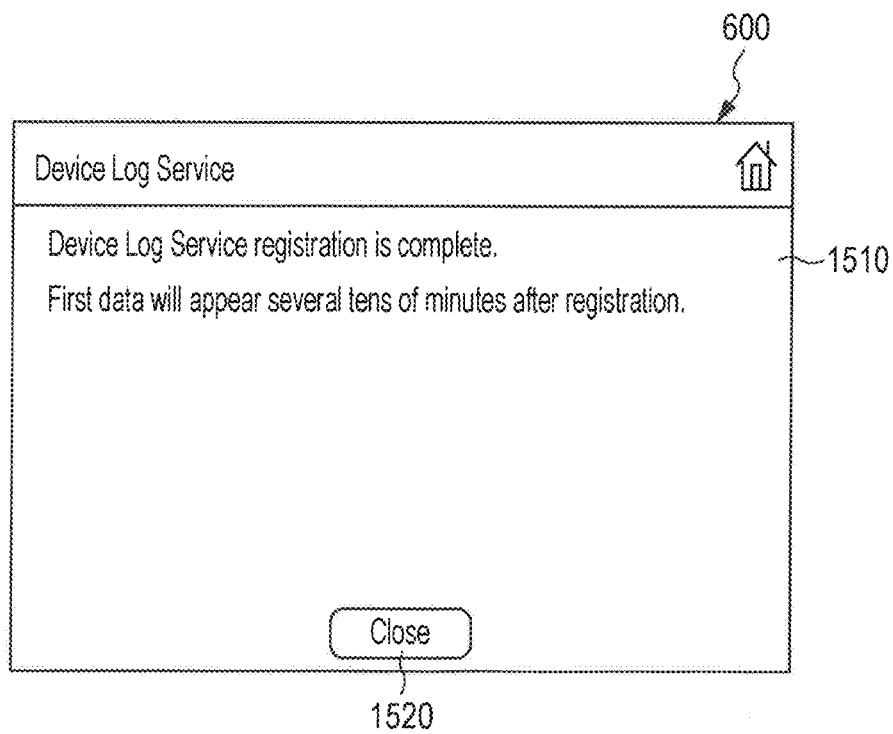
FIG. 14 is a table explanatorily illustrating an example data structure of a plug-in management table.
FIG. 15 is an explanatory diagram illustrating an example display of the screen.

(4) A display element for notifying that application installation performed in accordance with the selection of the display element in (3) above is complete Specifically, the display element corresponds to an indicator or the like in an installation-completion presenting region 1510 (described later) in the example in FIG. 15.

The installation processing module 115 is connected to the communication management module 105, the plug-in management module 110, and the web browser module 125. By using the to-be-executed application information acquired by the web browser module 125, the installation processing module 115 executes a process in which an application corresponding to the to-be-executed application information is installed on the image processing apparatus 100.

If the executable-format data included in the to-be-executed application information acquired by the web browser module 125 has not been installed on the image processing apparatus 100, the installation processing module 115 may install the executable-format data.

If the executable-format data included in the to-be-executed application information acquired by the web browser module 125 has been installed on the image processing apparatus 100, the installation processing module 115 may install and overwrite the executable-format data. The installation processing module 115 may generally upgrade the version of the application but may downgrade the application to an old version. The installation processing module 115 may also apply, to the data, a patch file for updating or correcting data or the like.

The external management apparatus 150 includes a communication management module 155, an image-processing-apparatus management module 160, and a plug-in management module 165.

The communication management module 155 is connected to the image-processing-apparatus management module 160 and the plug-in management module 165. The communication management module 155 is also connected to the firewall device 145 through the communication network 194 and is further connected to the firewall device 140 through the communication network 192. The communication management module 155 communicates with the image processing apparatus 100.

The image-processing-apparatus management module 160 is connected to the communication management module 155. The image-processing-apparatus management module 160 manages information regarding the image processing apparatus 100 managed by the external management apparatus 150. Examples of managed information include the model-identification information regarding the image processing apparatus 100, installable applications, an installation site, and a usage charge.

The plug-in management module 165 is connected to the communication management module 155. The plug-in management module 165 acquires the information identifying the application requested to be installed on the image processing apparatus 100 and transmitted through the web page displayed on the image processing apparatus 100.

The plug-in management module 165 transmits, to the image processing apparatus 100 through the web browser, the to-be-executed application information having data in the converted format to be used to install the application identified on the basis of the acquired information on the image processing apparatus 100.

The plug-in management module 165 may further acquire the model-identification information identifying the model of the image processing apparatus 100 or data-format information identifying the data format to be used to install the application on the image processing apparatus 100.

The plug-in management module 165 may generate to-be-executed application information including an application matching the model identified by the model-identification information or the data-format information and may transmit the to-be-executed application information to the image processing apparatus 100. For example, the plug-in management module 165 generates SOAP with Attachments data or the like having the executable-format data added thereto. Specifically, the plug-in management module 165 processes the application on the basis of the aforementioned negotiation result.

The plug-in management module 165 may further request an external apparatus to generate the to-be-executed application information to reduce the load on the external management apparatus 150. The external apparatus herein corresponds to, for example, another server connected to the external management apparatus 150 through the communication network 194.

The plug-in management module 165 may also request the executable-format data for the application from the external apparatus and acquire the executable-format data. These are performed to reduce the load on the external management apparatus 150.

Although the image processing apparatus 100 receives the executable-format data for the application from the external management apparatus 150 and executes the installation process in the example, the image processing apparatus 100 may execute the installation process through data other than the executable-format data, depending on the throughput of the image processing apparatus 100 (particularly the installation processing module 115). For example, the external management apparatus 150 may transmit data in a general format for the application (such as in an intermediate data format one step before the executable-format data or the source code format), and the image processing apparatus 100 (particularly the installation processing module 115) may convert the transmitted format into the format allowing the data to be executed by the image processing apparatus 100.

The firewall device 140 is disposed between the communication network 190 and the communication network 192. The image processing apparatus 100 is placed inside the firewall of the firewall device 140, and the external management apparatus 150 is placed outside the firewall of the firewall device 140. For example, the image processing apparatus 100 is placed in the intranet of the company. Accordingly, communication may be performed at any time from the image processing apparatus 100 inside the firewall of the firewall device 140 to the external management apparatus 150 outside the firewall of the firewall device 140, but communication from the external management apparatus 150 to the image processing apparatus 100 is not necessarily allowed to be performed at any time. Only when the image processing apparatus 100 communicates with the external management apparatus 150, the external management apparatus 150 is allowed to communicate with the image processing apparatus 100 in response.

The firewall device 140 is connected to the communication management module 105 of the image processing apparatus 100 through the communication network 190 and is also connected to the firewall device 145 through the communication network 192.

The firewall device 145 is connected to the firewall device 140 through the communication network 192 and is also connected to the communication management module 155 of the external management apparatus 150 through the communication network 194. The firewall device 145 is not necessarily needed in the configuration of the exemplary embodiments but is generally provided to protect apparatuses inside the firewall of the firewall device 145. The firewall device 145 has the same function as the firewall device 140.

Figure 2:
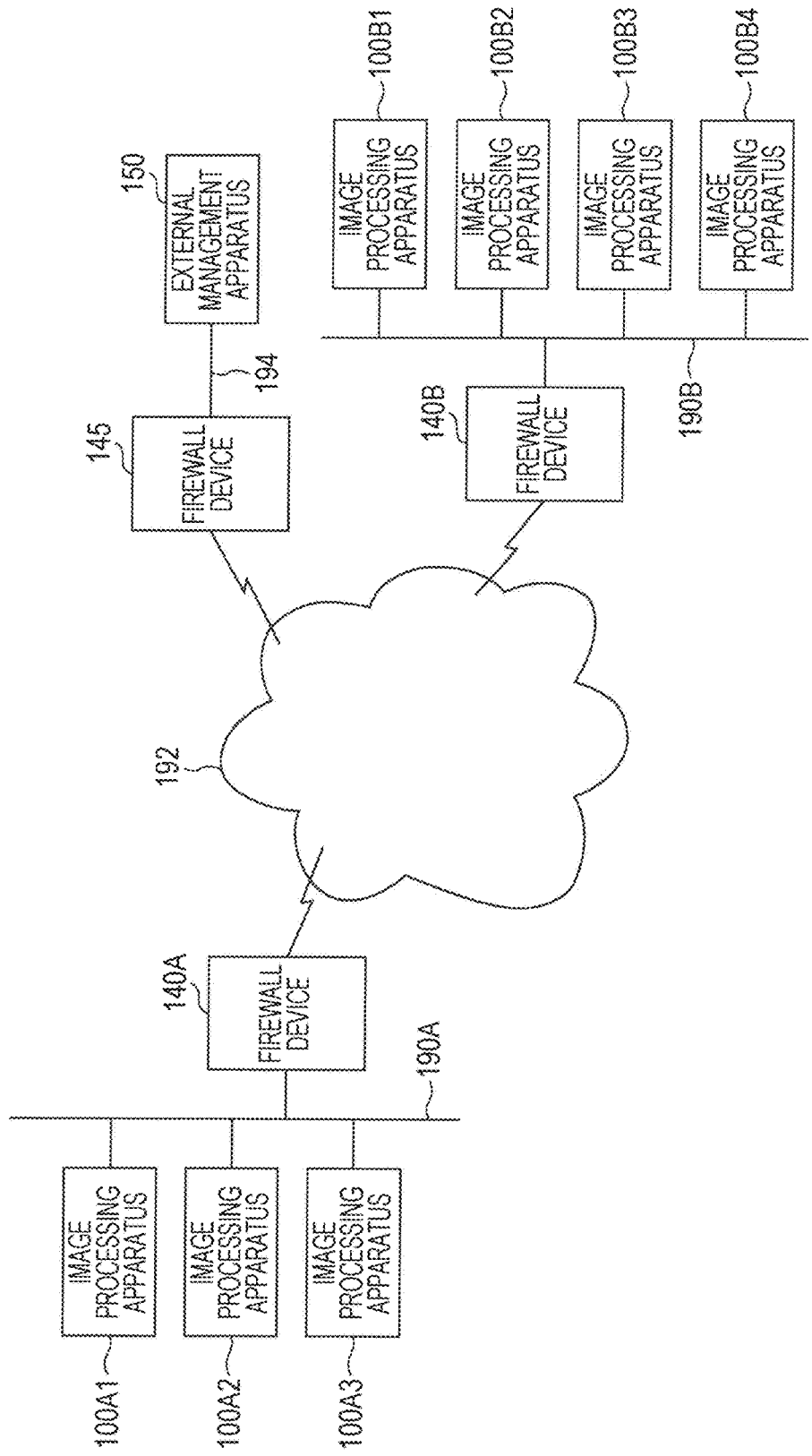
FIG. 2 is an explanatory diagram illustrating an example system configuration of the exemplary embodiments.

FIG. 2 is an explanatory diagram illustrating an example system configuration of the exemplary embodiments.

Image processing apparatuses 100A1, 100A2, and 100A3, and a firewall device 140A are connected to each other through a communication network 190A.

Image processing apparatuses 100B1, 100B2, 100B3, and 100B4, and a firewall device 140B are connected to each other through a communication network 190B.

The firewall device 145 and the external management apparatus 150 are connected to each other through the communication network 194. The communication networks 190, 192, and 194 may each be a wireless or wired network or may be a network obtained by combining these. For example, the communication network 192 may be the Internet serving as a communication infrastructure, and the communication networks 190 and 194 may each be an intranet of a company. The functions of the external management apparatus 150 may be implemented as cloud services.

The example in FIG. 2 is different from the example in FIG. 16 in that the administrator apparatus 1670 is not connected to the communication network 190. Note that the example in FIG. 2 merely illustrates that the administrator apparatus 1670 is not needed to install a plug-in and does not illustrate that connection of the administrator apparatus 1670 to the communication network 190 is to be eliminated.

If installation of the plug-in is attempted only through the operation panel of the image processing apparatus 100 without using the administrator apparatus 1670, a SOAP message with an attachment needs to be transmitted through the web browser.

Programs written in JavaScript running in a web browser describe fewer processes than programs such as Windows (registered trademark), Linux (registered trademark), Java (registered trademark), and the .NET Framework, and thus have a process failure, a slow effective speed, high memory usage, and the like.

According to the SOAP with Attachments specification, data for communication is described in a text format and a binary format that are mixed together. It is difficult to generate the data in these formats in a web browser.

Figure 3:
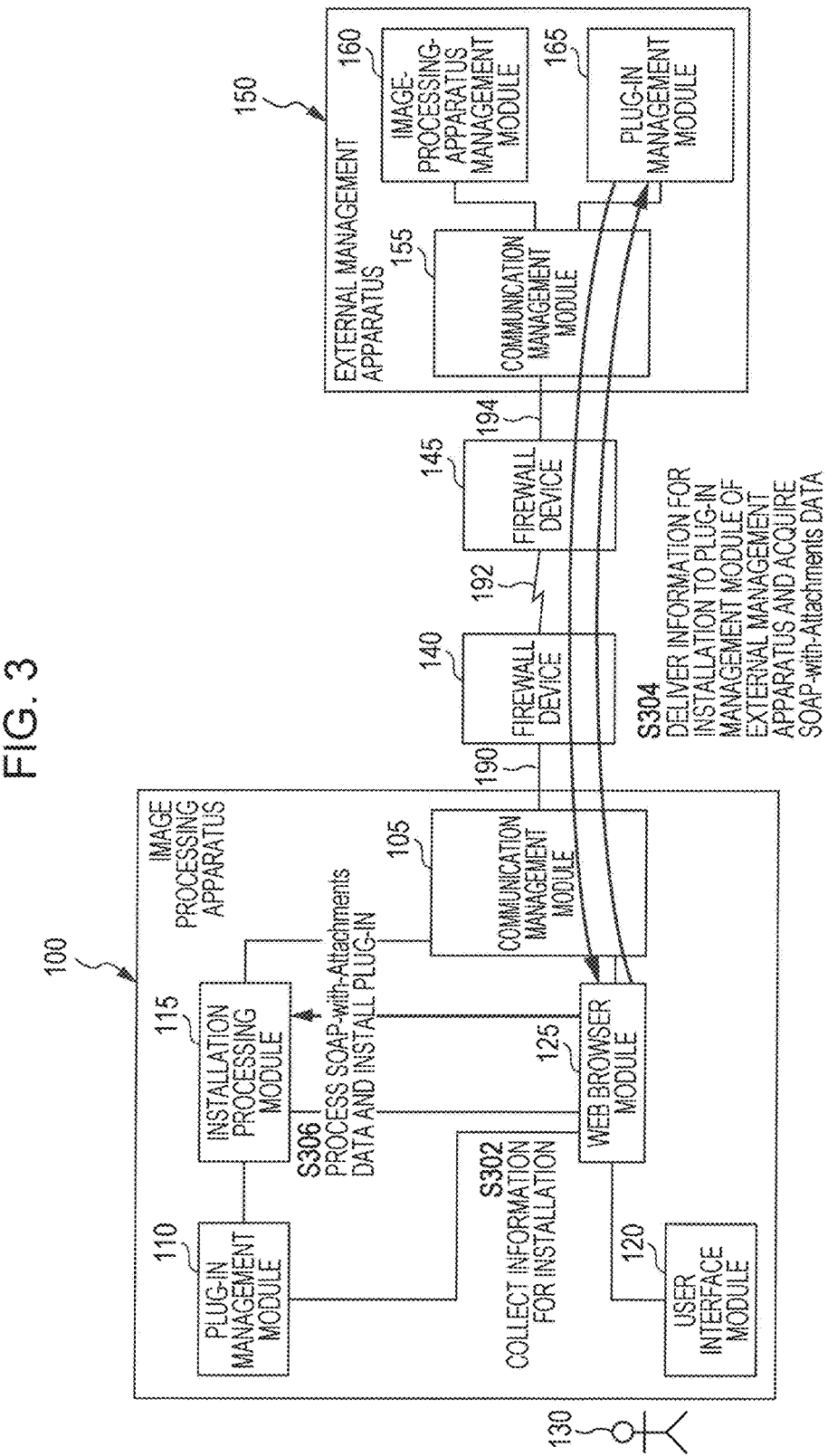
FIG. 3 is an explanatory diagram illustrating an example process executed in the exemplary embodiments.

Hence, the exemplary embodiments execute a process as illustrated in the example in FIG. 3. FIG. 3 is an explanatory diagram illustrating an example process executed in the exemplary embodiments.

In step S302, the web browser module 125 collects pieces of information for installation (installation information) from the plug-in management module 110.

In step S304, the web browser module 125 transmits the installation information to the plug-in management module 165 of the external management apparatus 150 and acquires SOAP-with-Attachments data from the plug-in management module 165. The web browser module 125 delivers the SOAP-with-Attachments data to the installation processing module 115.

In step S306, the installation processing module 115 processes the SOAP-with-Attachments data and thereby installs a plug-in.

Specifically, the external management apparatus 150 does not deliver a plug-in file to the web browser module 125 of the image processing apparatus 100 but transmits back the entire communication using SOAP with Attachments including the plug-in by using the installation information.

The web browser module 125 connected to the external management apparatus 150 does not execute a complicated process and just delivers, to the installation processing module 115, the entire data transmitted back from the external management apparatus 150. Since the data is the SOAP-with-Attachments data, the installation processing module 115 may install the plug-in.

The unnecessariness of a complicated process enables description of the JavaScript program running in the web browser module 125, and an operation performed on only the user interface module 120 of the image processing apparatus 100 enables the installation of the plug-in.

Figure 4:
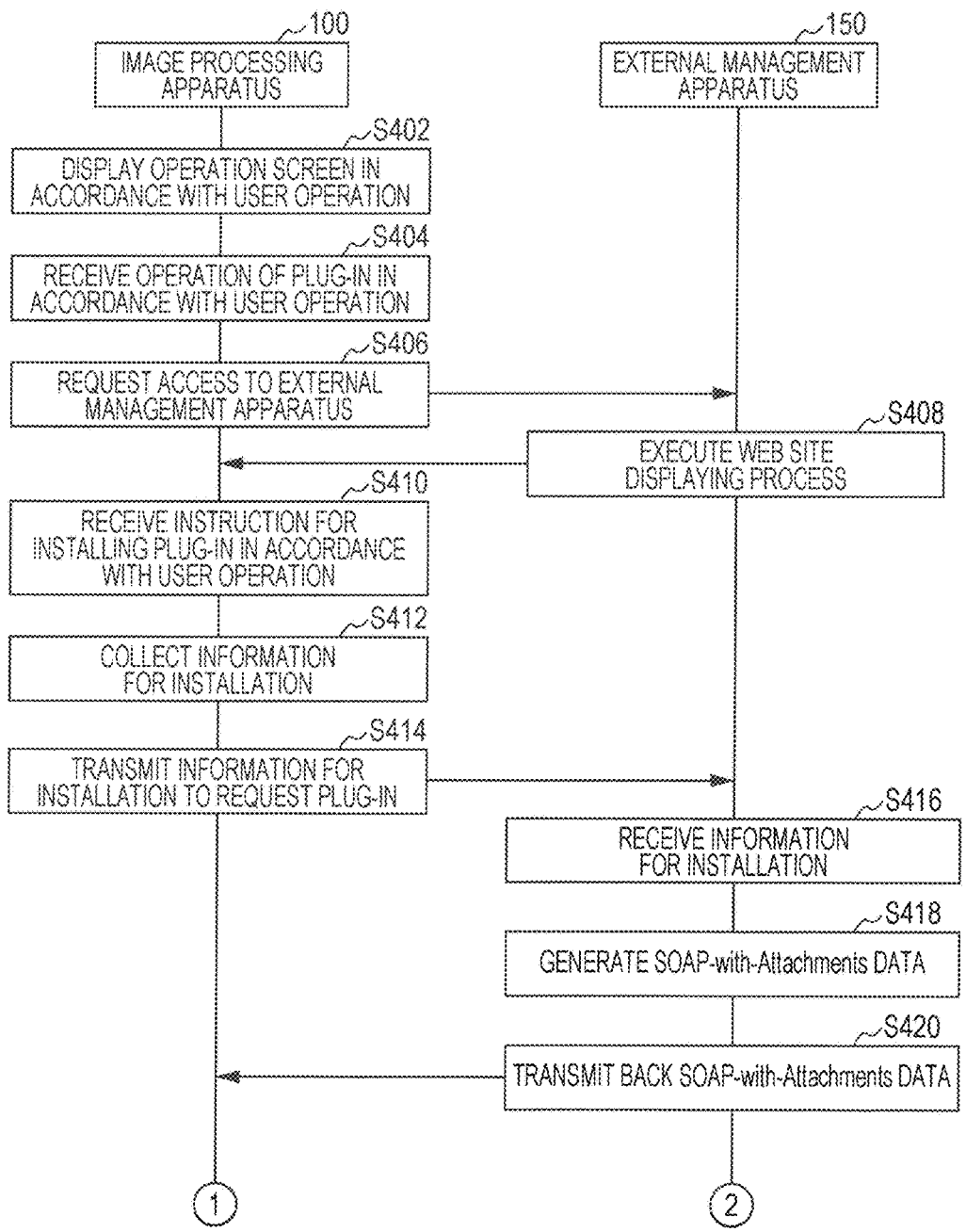
FIG. 4 is a flowchart illustrating an example process executed in the exemplary embodiments.
Figure 5:
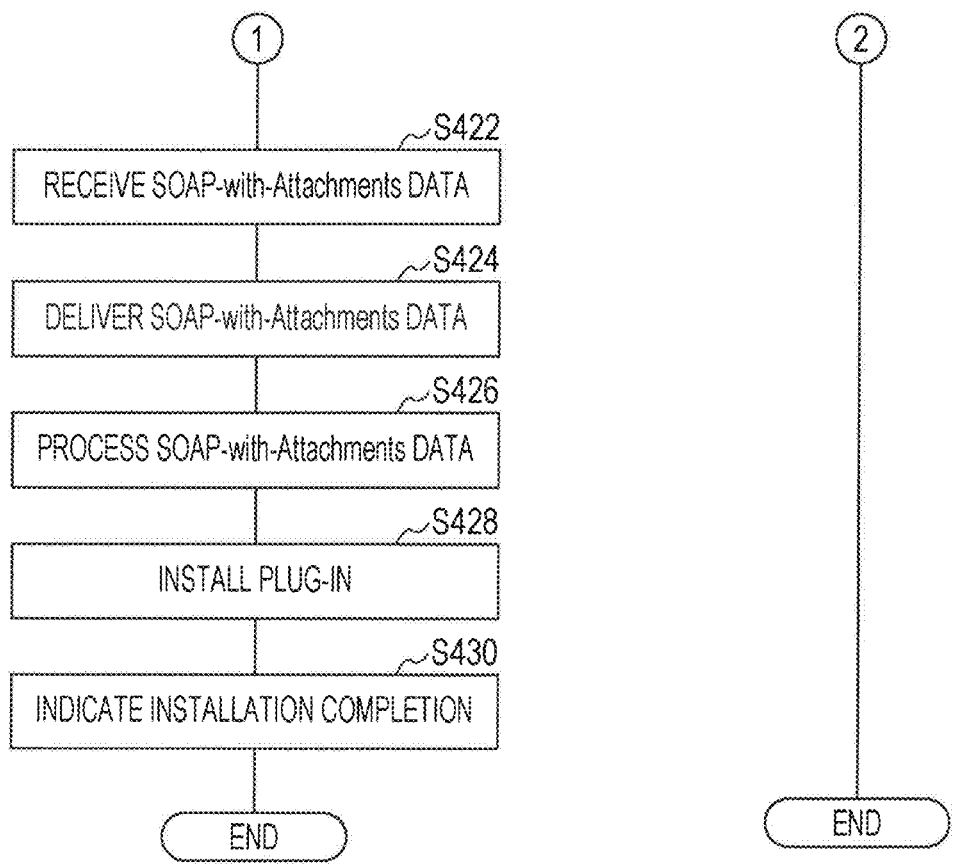
FIG. 5 is a flowchart illustrating the example process executed in the exemplary embodiments.

This will be described in more detail with reference to FIGS. 4 and 5. FIGS. 4 and 5 are flowcharts illustrating an example process executed in the exemplary embodiments. The image processing apparatus 100 provides the function of installing (setting up) a plug-in without using an information processing apparatus such as a PC.

In step S402, the user interface module 120 displays an operation screen in accordance with an operation performed by a user 130 who is an administrator.

Figure 6B:
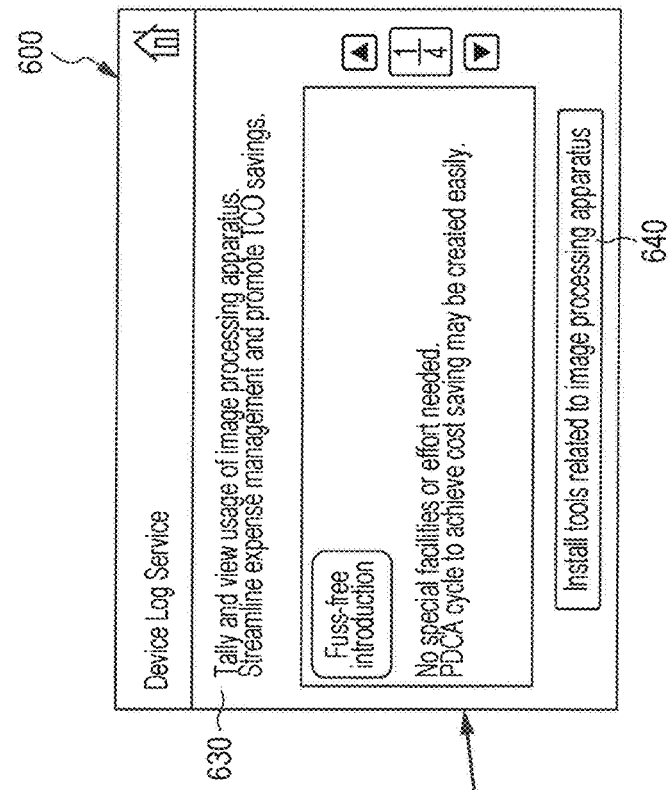
FIGS. 6A and 6B are each an explanatory diagram illustrating an example display of a screen.
Figure 6A:
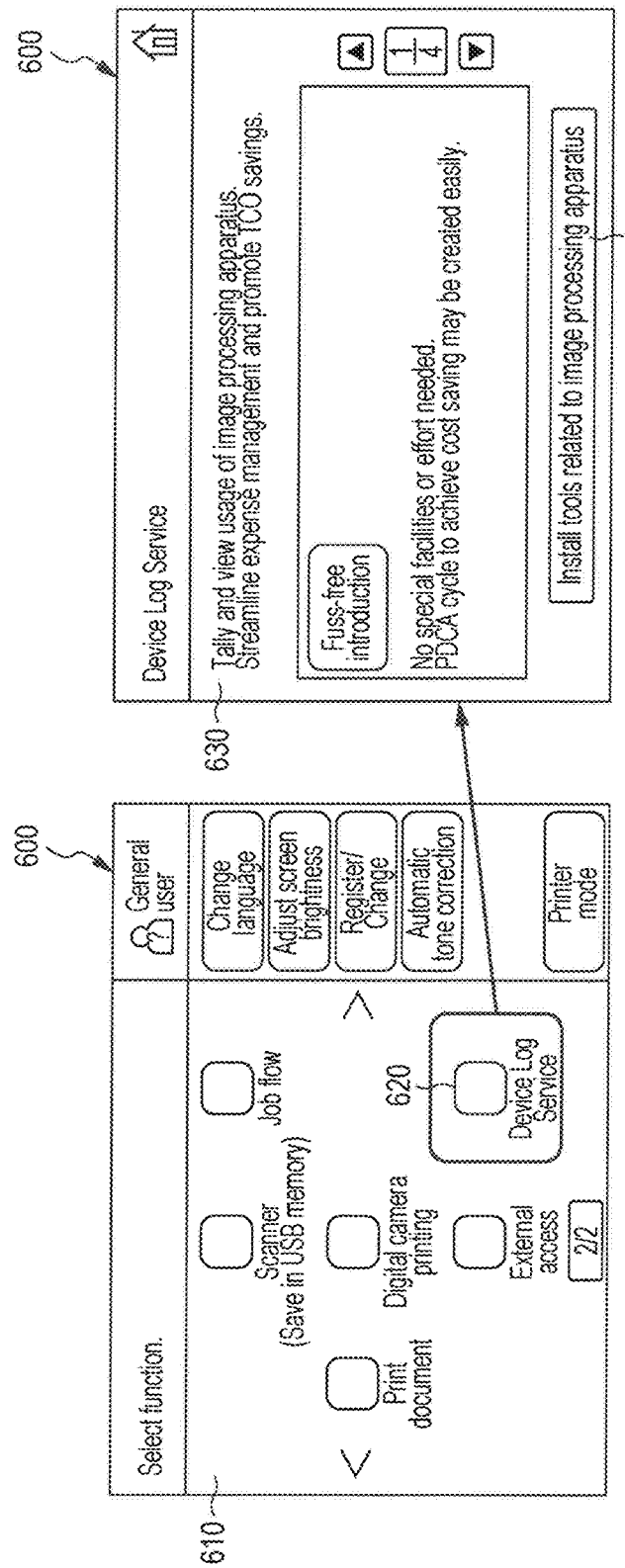

FIGS. 6A and 6B are each an explanatory diagram illustrating an example display of a screen 600.

In the example in FIG. 6A, an operation presenting region 610 is displayed on the screen 600, and icons representing the basic functions (such as Scanner in FIG. 6A) of the image processing apparatus 100, the Device-Log-Service icon 620 representing Device Log Service described above, and other elements are displayed in the operation presenting region 610.

In step S404, the user interface module 120 receives an operation related to the plug-in in accordance with the operation performed by the user 130. Specifically, the user interface module 120 opens a web site displayed on the external management apparatus 150 in the web browser of the image processing apparatus 100 in accordance with the operation performed by the user 130. To open the web site, a general operation for browsing a web site is performed, such as typing a uniform resource locator (URL) in the address bar, selecting a web site from bookmarks, or clicking a link.

In the example in FIG. 6A, the Device-Log-Service icon 620 and the like are displayed on the screen 600. Clicking the Device-Log-Service icon 620 corresponds to the operation for opening the web site displayed on the external management apparatus 150. That is, a lick is clicked in this example.

In step S406, the web browser module 125 requests access to the external management apparatus 150.

In step S408, the image-processing-apparatus management module 160 executes a process for displaying the web site. For example, as illustrated in FIG. 6B, the image-processing-apparatus management module 160 displays a plug-in-installation-request presenting region 630 on the screen 600 and the "Install tools related to image processing apparatus" button 640 in the plug-in-installation-request presenting region 630. Messages such as "Tally and view usage of image processing apparatus. Streamline expense management and promote TCO savings." and "No special facilities or effort needed. PDCA cycle to achieve cost saving may be created easily." are displayed in the plug-in-installation-request presenting region 630.

In step S410, the user interface module 120 receives an instruction for installing the plug-in in accordance with the operation performed by the user 130. For example, when the "Install tools related to image processing apparatus" button 640 illustrated in FIG. 6B (FIG. 7A) is selected, the JavaScript program is run in the web browser. FIGS. 7A and 7B are each an explanatory diagram illustrating an example display of the screen 600. In the example in FIG. 7B, an installation-confirmation presenting region 710 is displayed on the screen 600, and the Start button 720 and a Cancel button 730 are displayed in the installation-confirmation presenting region 710. In the installation-confirmation presenting region 710, a message such as "Before starting installation, subscribe Device Log Service and configure image processing apparatus to connect to the Internet. Visit our official website for details." is displayed. Selecting the Start button 720 corresponds to the installation instruction. Alternatively, a series of selections of the "Install tools related to image processing apparatus" button 640 and the Start button 720 may be regarded as the installation instruction.

In step S412, the web browser module 125 collects pieces of installation information from the plug-in management module 110.

Specifically, the JavaScript program issues a SOAP request to the installation processing module 115 of the image processing apparatus 100.

FIGS. 8 and 9 respectively illustrate examples of the request and a response.

FIG. 8 is an explanatory diagram illustrating an example of data details of a request 800. The web browser module 125 generates, for example, the following data as the request 800.

```
<?xml version="1.0" ?>
<soapEnv:Envelope
xmlns:soapEnv="http://schemas.xmlsoap.org/soap/envelope/">
    <soapEnv:Body>
        <GetAttribute xmlns="http://www.fujixerox.co.jp/">
            <ProductCode/>
        </GetAttribute>
    </soapEnv:Body>
</soapEnv:Envelope>
```

FIG. 9 is an explanatory diagram illustrating an example of data details of a response 900. The installation processing module 115 (or the plug-in management module 110) generates, for example, the following data as the response 900.

```
<?xml version="1.0" ?>
<env:Envelope
xmlns:env="http://schemas.xmlsoap.org/soap/envelope/">
    <env:Body xmlns:xsd="http://www.w3.org/2000/10/XMLSchema">
        <GetAttributeResponse
xmlns="http://www.fujixerox.co.jp/">
            <ProductCode>NC100497</ProductCode>
        </GetAttributeResponse>
    </env:Body>
</env:Envelope>
```

The examples in FIGS. 8 and 9 respectively illustrate that the request 800 (particularly in a target line 810) requests acquisition of the model code (ProductCode) of the image processing apparatus 100 and that the response 900 (particularly in a target line 910) has a code "NC100497" transmitted back from the installation processing module 115 (or the plug-in management module 110).

The request 800 and the response 900 are both the text data and may thus be processed easily with the JavaScript program.

Note that to perform communication with the installation processing module 115 of the image processing apparatus 100 from the web site on the external management apparatus 150, a special process is needed for a security reason.

Generally, this is achieved in such a manner that the installation processing module 115 provides the header of the response with an identifier indicating permission of communication through the URL of the external management apparatus 150.

This is a publicly known technique called cross-origin resource sharing (CORS).

Further, as described above in step S412, the web browser module 125 collects pieces of information needed for installing the plug-in on the image processing apparatus 100.

FIG. 10 is an explanatory diagram illustrating an example of data details of a request 1000. The web browser module 125 generates, for example, the following data as the request 1000.

```
<?xml version="1.0" ?>
<soapEnv:Envelope
xmlns:soapEnv="http://schemas.xmlsoap.org/soap/envelope/">
    <soapEnv:Body>
        <GetPlugin xmlns="http://www.fujixerox.co.jp/">
            <PluginID>DeviceLogService</PluginID>
        </GetPlugin>
    </soapEnv:Body>
</soapEnv:Envelope>
```

FIG. 11 is an explanatory diagram illustrating an example of data details of a response 1100. The installation processing module 115 (or the plug-in management module 110) generates, for example, the following data as the response 1100.

```
<?xml version="1.0" ?>
<env:Envelope
xmlns:env="http://schemas.xmlsoap.org/soap/envelope/">
    <env:Body xmlns:xsd="http://www.w3.org/2000/10/XMLSchema">
        <GetPluginResponse xmlns="http://www.fujixerox.co.jp/"
/>
    </env:Body>
</env:Envelope>
```

The examples in FIGS. 10 and 11 respectively illustrate that the request 1000 (particularly in a target line 1010) requests an inquiry of whether the plug-in "DeviceLogService" has been installed and that the response 1100 (particularly, nothing is present between a target line 1110 and a target line 1120) has an empty response made from the installation processing module 115 (or the plug-in management module 110), that is, the result indicating that the plug-in has not been installed has been transmitted back. Note that if the plug-in has been installed, a version number or the like is described between the target line 1110 and the target line 1120.

In step S414, the web browser module 125 transmits the installation information to the external management apparatus 150 to request the plug-in. The web browser module 125 transmits, for example, request data 1200 illustrated in FIG. 12. FIG. 12 is an explanatory diagram illustrating an example of data details of the request data 1200.

The web browser module 125 generates and transmits, for example, "PluginID=DeviceLogService&ProductCode=NC100497&Installed=No" as the request data 1200.

The JavaScript program running in the web browser requests the external management apparatus 150 to generate a SOAP with Attachments request.

The request data 1200 has information acquired so far from the installation processing module 115 (or the plug-in management module 110).

The request data 1200 illustrated in the example in FIG. 12 indicates that a part "PluginID=DeviceLogService" represents a SOAP with Attachments request for installing an extension plug-in "DeviceLogService" on the image processing apparatus 100 as a request for addition, that a part "ProductCode=NC100497" represents the model code of the image processing apparatus 100, and that a part "Installed=No" represents that the plug-in has not been installed on the image processing apparatus 100.

Note that a response to the request is transmitted in binary data (SOAP with Attachments request data 1300 illustrated in the example in FIG. 13).

In step S416, the plug-in management module 165 receives the installation information. In the example described above, the plug-in management module 165 receives the request data 1200.

In step S418, the plug-in management module 165 generates SOAP-with-Attachments data, for example, the SOAP with Attachments request data 1300.

FIG. 13 is an explanatory diagram illustrating an example of data details of the SOAP with Attachments request data 1300. The plug-in management module 165 generates, for example, the following data as the SOAP with Attachments request data 1300.

```
--boundary
Content-Type: text/xml; charset=UTF-8
Content-Transfer-Encoding: binary
Content-ID: <2>
<?xml version="1.0" ?>
<soapEnv:Envelope
    xmlns:soapEnv="http://schemas.xmlsoap.org/soap/envelope/">
    <soapEnv:Body>
        <InstallPlugin xmlns="http://www.fujixerox.co.jp/">
            <PluginFile href="cid:1"/>
        </InstallPlugin>
    </soapEnv:Body>
</soapEnv:Envelope>
--boundary
Content-Type: application/octet-stream
Content-Transfer-Encoding: binary
Content-ID: <1>
(binary data of the plug-in)
--boundary--
```

The external management apparatus 150 generates the SOAP with Attachments request data 1300 on the basis of the request (request data 1200).

Parts for "--boundary", "Content-Type", "Content-Transfer-Encoding", and "Content-ID" are described in the format defined in accordance with the SOAP with Attachments specification. The external management apparatus 150 generates data processable by the installation processing module 115 through the web browser module 125 of the image processing apparatus 100. To transmit such data to the image processing apparatus 100, a framework defined by the standard specification that is SOAP with Attachments just taken as an example is used.

The part "InstallPlugin" represents new installation of a plug-in.

This corresponds to "Installed=No" in the request data 1200 transmitted from the web browser module 125.

Note that "Installed=Yes" leads to "UpdatePlugin" (a request for installing and overwriting the plug-in).

Binary data of a file for the plug-in "DeviceLogService" for the model "NC100497" is added to the SOAP with Attachments message, the file being stored in the external management apparatus 150. For example, programs in plug-in executable formats are managed using a plug-in management table 1400. FIG. 14 is a table explanatorily illustrating an example data structure of the plug-in management table 1400. The plug-in management table 1400 has a plug-in column 1410, a Product Code column 1420, and a plug-in file column 1430. Plug-in IDs are stored in the plug-in column 1410, model codes are stored in the Product Code column 1420, and plug-in files (or URLs storing programs in the plug-in executable format may be stored) are stored in the plug-in file column 1430.

These files are each a compressed file in which an execution module for running an extension plug-in on the corresponding image processing apparatus 100 and resources such as images are put together.

Although data in the text and binary formats is handled, the data is generated in the external management apparatus 150 (or an external apparatus requested by the external management apparatus 150 to perform processing), not in JavaScript running on the image processing apparatus 100, and may thus be generated without JavaScript constraints.

In step S420, the plug-in management module 165 transmits back the SOAP-with-Attachments data. For example, the plug-in management module 165 transmits the SOAP with Attachments request data 1300 described above.

In step S422, the web browser module 125 receives the SOAP-with-Attachments data.

In step S424, the web browser module 125 delivers the SOAP-with-Attachments data to the installation processing module 115. For example, JavaScript running in the web browser delivers, to the installation processing module 115, the SOAP with Attachments request data 1300 transmitted back from the external management apparatus 150 without any processing. It is difficult by nature to use JavaScript to handle data in the text and binary formats mixed together. However, the data (the SOAP with Attachments request data 1300) received from the external management apparatus 150 is herein just delivered to the installation processing module 115 without any processing and thus may be processed in even JavaScript (without constraints).

In step S426, the installation processing module 115 processes the SOAP with Attachments data.

In step S428, the installation processing module 115 installs the plug-in. In steps S426 and S428, the installation processing module 115 processes the request with the SOAP with Attachments request data 1300 and installs the extension plug-in on the image processing apparatus 100. The plug-in management module 110 manages the information regarding the installed plug-in.

In step S430, the user interface module 120 indicates installation completion. For example, after the plug-in is appropriately installed, the JavaScript program displays, in the web browser, an indicator indicating that the process is complete. Specifically, the web browser module 125 controls the user interface module 120 to present the installation-completion presenting region 1510 on the screen 600. FIG. 15 is an explanatory diagram illustrating an example display of the installation-completion presenting region 1510. The user interface module 120 displays the installation-completion presenting region 1510 on the screen 600 and a Close button 1520 in the installation-completion presenting region 1510. The user interface module 120 displays, in the installation-completion presenting region 1510, for example, a message "Device Log Service registration is complete. First data will appear several tens of minutes after registration." When the Close button 1520 is selected, the user interface module 120 closes the installation-completion presenting region 1510 and presents the operation presenting region 610 illustrated in the example in FIG. 6A.

An example hardware configuration of the image processing apparatus 100 and the external management apparatus 150 that are the exemplary embodiments will be described with reference to FIG. 18. FIG. 18 illustrates a configuration implemented by, for example, a PC and illustrates an example hardware configuration including a data reading unit 1817 such as a scanner and a data output unit 1818 such as a printer.

A CPU 1801 is a controller that executes processes in accordance with a computer program describing an execution sequence for the various modules described in the exemplary embodiments such as the communication management module 105, the plug-in management module 110, the installation processing module 115, the user interface module 120, the web browser module 125, the communication management module 155, the image-processing-apparatus management module 160, and the plug-in management module 165.

A read-only memory (ROM) 1802 is used to store the program used by the CPU 1801, operational parameters, and the like. A RAM 1803 is used to store the program used when the CPU 1801 is run, parameters appropriately varying when the CPU 1801 is run, and the like. These components are mutually connected by a host bus 1804 including a CPU bus and other components.

The host bus 1804 is connected to an external bus 1806 such as a peripheral component interconnect/interface (PCI) bus with a bridge 1805 placed therebetween.

A keyboard 1808 and a pointing device 1809 such as a mouse are input devices operated by the operator. A display 1810 has a liquid crystal display device, a cathode ray tube (CRT), or the like and displays various pieces of information as text information and image information. The display 1810 may be a touch screen or the like having both the functions of the pointing device 1809 and the display 1810.

A hard disk drive (HDD) 1811 has a hard disk (may be a flash memory or the like) incorporated therein, drives the hard disk, and records and reproduces the program run by the CPU 1801 and information. The hard disk stores therein the information regarding the plug-ins, the plug-ins, the to-be-executed application information, and the like. The hard disk further stores therein various other pieces of data, various computer programs, and the like.

A drive 1812 reads out data or a program recorded in a removable recording medium 1813 attached to the drive 1812, such as a magnetic disk, an optical disk, a magneto-optical disk, or a semiconductor memory, and supplies the data or the program to the RAM 1803 connected to the drive 1812 with an interface 1807, the external bus 1806, the bridge 1805, and the host bus 1804 located therebetween. The removable recording medium 1813 is also usable as a data recording area.

A connection port 1814 is a port for connection with an externally connected apparatus 1815 and has a USB- or IEEE1394-compliant connection unit. The connection port 1814 is connected to the CPU 1801 and the like with the interface 1807, the external bus 1806, the bridge 1805, the host bus 1804, and the like located therebetween. A communication unit 1816 is connected to a communication network and executes processes of data communication with external devices. The data reading unit 1817 is, for example, a scanner and executes processes of reading documents. The data output unit 1818 is, for example, a printer and executes processes of outputting document data.

The hardware configuration of the information processing apparatus 100 and the external management apparatus 150 in FIG. 18 merely illustrates a configuration example, and each exemplary embodiment is not limited to the configuration in FIG. 18. Any configuration that enables the modules described in the exemplary embodiment to be run may be employed. For example, at least one of the modules may be configured to run on hardware dedicated to the module (such as an application specific integrated circuit (ASIC)). At least one of the modules may be in an external system to be connected through a communication network. Further, multiple systems each serving as the system in FIG. 18 may be mutually connected through a communication network to work in cooperation with each other. In particular, the configuration may be incorporated in not only a personal computer but also a mobile telecommunication device (including a mobile phone, a smartphone, a mobile device, a wearable computer, and other devices), a personal digital electronics, a robot, a copier, a fax machine, a scanner, a printer, a multifunction printer, and other devices.

Note that the program described above may be provided by using a recording medium having the program recorded therein, and may be provided by using a communication medium. In this case, for example, the program described above may be regarded as an exemplary embodiment of the invention of a "non-transitory computer readable medium having a program recorded therein".

The "non-transitory computer readable medium having a program recorded therein" refers to a computer readable recording medium having a program recorded therein that is used for installation, execution, distribution, and the like of a program.

Examples of the recording medium include: a digital versatile disk (DVD) supporting "DVD-R, DVD-RW, DVD-RAM, and the like" that are standards designated by the DVD Forum and "DVD+R, DVD+RW, and the like" that are standards designated in accordance with "DVD+RW; a compact disc (CD) such as a CD read-only memory (CD-ROM), a CD recordable (CD-R), a CD rewritable (CD-RW), or the like; a Blu-ray (registered trademark) disc; a magneto-optical disk (MO); a flexible disk (FD); a magnetic tape; a hard disk; a ROM; an electrically erasable and programmable ROM (EEPROM (registered trademark)); a flash memory; a RAM; and a secure digital (SD) memory card.

Part or the entirety of the aforementioned program may also be saved on the recording medium to be stored or distributed. The program or part thereof may be transmitted through communication by using a transmission medium such as a wired network used for a LAN, a metropolitan area network (MAN), a wide area network (WAN), the Internet, an intranet, an extranet, or the like; a wireless communication network; or a combination of these. Alternatively, the program or part thereof may be transmitted by using carrier signals.

Further, the program may be part or the entirety of another program, or may be saved on a recording medium together with another program. The program may also be divided to be saved on multiple recording media. The program may be saved in any manner such as by being compressed or encrypted, as long as the program is restorable.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a processor programmed to function as:
   an identification unit that identifies one of pieces of information regarding applications that are executable by the image processing apparatus and that are acquired through a web browser of the image processing apparatus, the identification unit identifying the piece of information regarding one of the applications that is selected by an operator;
   a transfer requesting unit that requests an external apparatus to transfer the application in accordance with the piece of information identified by the identification unit;
   an acquisition unit that acquires, from the external apparatus through the web browser, to-be-executed application information that is to be used when the application requested by the transfer requesting unit to be transferred is installed on the image processing apparatus; and
   an execution unit that executes, by using the to-be-executed application information acquired by the acquisition unit, an installation process in which the application corresponding to the to-be-executed application information is installed on the image processing apparatus.

2. The image processing apparatus according to claim 1, wherein the to-be-executed application information includes data in an executable format for the application.

3. The image processing apparatus according to claim 2, wherein if the data in the executable format included in the to-be-executed application information acquired by the acquisition unit has not been installed on the image processing apparatus, the execution unit installs the data in the executable format.

4. The image processing apparatus according to claim 3, wherein if the data in the executable format included in the to-be-executed application information acquired by the acquisition unit has been installed on the image processing apparatus, the execution unit installs and overwrites the data in the executable format.

5. The image processing apparatus according to claim 1, wherein the transfer requesting unit transmits model-identification information to the external apparatus, the model-identification information identifying a model of the image processing apparatus.

6. The image processing apparatus according to claim 5, wherein the transfer requesting unit transmits data-format information to the external apparatus, the data-format information identifying a data format to be used to install the application on the image processing apparatus.

7. A server apparatus comprising:
   a processor programmed to function as
   an acquisition unit that acquires information identifying an application unrelated to a web browser that is transmitted through a web page displayed on an image processing apparatus and that is requested to be installed on the image processing apparatus; and
   a transmission unit that transmits, to the image processing apparatus through the web browser, to-be-executed application information having data in a converted format to be used when the application identified by the information acquired by the acquisition unit is installed on the image processing apparatus.

8. The server apparatus according to claim 7, wherein the acquisition unit further acquires model-identification information or data-format information, the model-identification information identifying a model of the image processing apparatus, the data-format information identifying a data format to be used to install the application on the image processing apparatus, and
   wherein the transmission unit generates the to-be-executed application information including the application matching the model identified by the model-identification information or the data-format information, and the transmission unit transmits the to-be-executed application information to the image processing apparatus.

9. The server apparatus according to claim 7, wherein the server apparatus further requests an external apparatus to generate the to-be-executed application information.

10. The server apparatus according to claim 9, wherein the server apparatus requests data in an executable format for the application from the external apparatus and acquires the data.

11. An image processing system comprising:
    an image processing apparatus; and
    a server apparatus,
    the image processing apparatus including
      a first processor programmed to function as
        an identification unit that identifies one of pieces of information regarding applications that are executable by the image processing apparatus and that are acquired through a web browser of the image processing apparatus, the identification unit identifying the piece of information regarding one of the applications that is selected by an operator,
        a transfer requesting unit that requests the server apparatus to transfer the application in accordance with the piece of information identified by the identification unit,
        a first acquisition unit that acquires, from the server apparatus through the web browser, to-be-executed application information that is to be used when the application requested by the transfer requesting unit to be transferred is installed on the image processing apparatus, and
        an execution unit that executes, by using the to-be-executed application information acquired by the first acquisition unit, an installation process in which the application corresponding to the to-be-executed application information is installed on the image processing apparatus,
    the server apparatus including
      a second processor programmed to function as
        a second acquisition unit that acquires information identifying the application that is transmitted through a web page displayed on the image processing apparatus and that is requested to be installed on the image processing apparatus, and a transmission unit that transmits, to the image processing apparatus through the web browser, the to-be-executed application information having data in a converted format to be used when the application identified by the information acquired by the second acquisition unit is installed on the image processing apparatus.

* * * * *